United States Patent
Zhang et al.

(10) Patent No.: US 9,802,448 B2
(45) Date of Patent: Oct. 31, 2017

(54) ASSISTANT ARM FOR AUTOMOBILE TIRE CHANGER AND METHOD FOR MANUFACTURING PRINCIPAL PARTS OF THE ASSISTANT ARM

(71) Applicant: BRIGHT TECHNOLOGY CO., LTD., Yingkou, Liaoning Province (CN)

(72) Inventors: Yong Zhang, Yingkou (CN); Bai Zhang, Yingkou (CN)

(73) Assignee: CORWEI (YINGKOU) INDUSTRIAL CO., LTD., Yingkou, Liaoning Province (CN)

( * ) Notice: Subject to any disclaimer, the term of this patent is extended or adjusted under 35 U.S.C. 154(b) by 215 days.

(21) Appl. No.: 14/865,292

(22) Filed: Sep. 25, 2015

(65) Prior Publication Data

US 2016/0089940 A1   Mar. 31, 2016

(30) Foreign Application Priority Data

Sep. 26, 2014   (CN) .......................... 2014 1 0497171

(51) Int. Cl.
*B60C 25/13* (2006.01)
*B60C 25/135* (2006.01)
(Continued)

(52) U.S. Cl.
CPC .......... *B60C 25/13* (2013.01); *B60C 25/0506* (2013.01); *B60C 25/135* (2013.01); *B60C 25/138* (2013.01)

(58) Field of Classification Search
CPC ..... B60C 25/138; B60C 25/13; B60C 25/132; B60C 25/0515; B60C 25/135; B60C 25/0506
See application file for complete search history.

(56) References Cited

U.S. PATENT DOCUMENTS

2009/0266494 A1* 10/2009 Sotgiu ................... B60C 25/135
157/1.24

FOREIGN PATENT DOCUMENTS

CN   102452284 A   5/2012
CN   202345308 U   7/2012
(Continued)

*Primary Examiner* — Robert Scruggs
(74) *Attorney, Agent, or Firm* — Pro-TECHTOR International Services; Ian Oglasby

(57) ABSTRACT

The present disclosure provides an assistant arm for an automobile tire changer and a method for manufacturing principal parts of the assistant arm. The assistant arm is of a one-for-two structure. A longitudinal actuator is connected to a sliding body, with an upper tire pressing mechanism hinged to the upper end and a lower tire pressing mechanism hinged to the lower end. A guide rail plate is arranged on a vertical column to form a combined guide rail. The guide rail plate is made of 45# bar-like steel plate, and has a straightness and a flatness of less than or equal to 0.05 mm/m. The vertical column includes a square steel tube as an anti-buckling beam, and several protrusions are welded onto upper and lower portions and a lateral surface of the vertical column to serve as a mounting reference surface with a flatness of less than or equal to 0.1 mm/m. An upper stopper, a lower stopper, a first lateral rib and a second lateral rib are welded to the sliding body within which a slider is arranged. The sliding body is connected to a piston rod of the longitudinal actuator by means of a thrust joint bearing. A lower end of the longitudinal actuator is hinged to a bottom of the vertical column through a lug shaft. Upper and lower laterally-swinging guide sleeve are each provided with a claw wrench. A console consists of a handle, a front plate welding assembly, a rear cover plate welding assembly, a tapered gasket and a sunk screw. The combined guide rail, the sliding body and the console, after being subjected to (Continued)

rough and fine machining, are combined together so as to form the assistant arm.

6 Claims, 14 Drawing Sheets

(51) Int. Cl.
*B60C 25/05* (2006.01)
*B60C 25/138* (2006.01)

(56) References Cited

FOREIGN PATENT DOCUMENTS

| | | |
|---|---|---|
| CN | 202935101 U | 5/2013 |
| CN | 204415060 U | 6/2015 |
| EP | 1157860 A2 | 11/2001 |
| EP | 1946946 A1 | 7/2008 |
| EP | 2316667 A1 | 4/2011 |

\* cited by examiner

ASSISTANT ARM FOR AUTOMOBILE TIRE CHANGER AND METHOD FOR MANUFACTURING PRINCIPAL PARTS OF THE ASSISTANT ARM

CROSS-REFERENCE TO RELATED APPLICATION

The present application claims a priority of the Chinese patent application No. 201410497171.X filed on Sep. 26, 2014, which is incorporated herein by reference in its entirety.

TECHNICAL FIELD

The present disclosure relate to the field of automobile tire changer, in particular to the design and manufacture of an assistant arm for a automobile tire changer mounted at an operating side of a main body of the automobile tire changer.

BACKGROUND

When replacing an tire with a automobile tire changer, at first it is required to separate a bead of the tire from a rim using an assistant arm for the tire changer, thereby to disassemble and assemble the tire. During the disassembly and the assembly, such a requisite and complex step as "tire pressing" is also required. In a sense, the assistant arm plays a very important role in the properties of the automobile tire changer.

Currently, there are two kinds of assistant arms. One is of a one-for-one type, i.e., one longitudinal actuator is used to actuate one tire pressing mechanism provided with a bead separator. This tire pressing mechanism is further provided with a turn-over function so as to facilitate the separation of the beads at two ends of the tire. This assistant arm is less automatic and has a complex structure, so it will take more effort to carry out the turn-over operation. The other is of a two-for-two type, i.e., two longitudinal actuators are used to actuate two identical tire pressing mechanisms each provided with a bead separator, respectively. The two tire pressing mechanisms can move up and down independently of each other and meanwhile the bead separators can synchronous move laterally, so as to facilitate the separation of the beads at the two ends of the tire without the turn-over function. The synchronous lateral movement of the bead separators is achieved by a fixed push-pull flexible shaft. This assistant arm is more automatic, but it is very expensive and its control system is very complex.

The tire pressing mechanism of the existing assistant arm moves along a longitudinal direction of a guide rail member. Currently, there are two kinds of guide rail members. One is made of a fine, square steel profile. Because there are very strict requirements on the precision, this steel profile is very expensive and used rarely. The other is formed by welding a guide rail with an anti-buckling beam. This guide rail member is cheap and of a simple structure, so it has been widely used. However, due to a long welding seam along the guide rail, there exists great post-welding deformation for the guide rail member, and it is difficult to correct the deformation after the welding. In addition, even when the deformation is corrected, the precision loss may occur too. As a result, when a mobile member moves along the guide rail member, a so-called "crawling phenomenon" will occur, and the tire disassembly and assembly procedures will be adversely affected, resulting in a hidden peril of the accident.

SUMMARY

An object of the present disclosure is to provide an assistant arm for an automobile tire changer and a method for manufacturing principal parts of the assistant arm, so as to meet the operation requirements, simplify the structure thereof, facilitate the maintenance and operation, and reduce the production cost.

In one aspect, in order to overcome such drawbacks of an existing assistant arm that its tire pressing mechanism is of a complex structure and the operation thereof is complicated, there is a remarkable post-welding deformation for a guide rail and it is difficult to correct this distortion, the present disclosure provides in one embodiment an assistant arm for an automobile tire changer, mounted at an operating side of a main body of the automobile tire changer, and including a longitudinal actuator, a lateral actuator, an upper guide column, a lower guide column, an upper bead separator and a lower bead separator. The assistant arm is of a one-for-two structure, i.e., one longitudinal actuator is used to drive a slider, thereby to actuate two tire pressing mechanisms. The longitudinal actuator is provided with one sliding body that slides along a guide rail plate, an upper end of the sliding body is hinged to the upper tire pressing mechanism, and a lower end thereof is hinged to the lower tire pressing mechanism. The two tire pressing mechanisms can be swung outwardly or locked with the sliding body separately.

The upper tire pressing mechanism includes an upper laterally-swinging guide sleeve, the upper guide column, the upper bead separator, a first micro-motion cylinder, a first locking plate, a first return spring and an upper cylinder cover. The lower tire pressing mechanism includes a lower laterally-swinging guide sleeve, the lower guide column, the lower bead separator, a second micro-motion cylinder, a second locking plate, a second return spring and a lower cylinder cover.

The guide rail plate is mounted onto a vertical column to form a combined guide rail which forms a moving pair with the sliding body. The guide rail plate is a bar-like plate made of 45# steel and having a rigidity of HRC42, and a straightness and a flatness of each less than or equal to 0.05 mm/m.

The vertical column includes a square or rectangular tube as an anti-buckling beam, several small disc-shaped front protrusions are welded onto an upper portion of the vertical column, and several small disc-shaped lower protrusions are welded onto a lower portion, and at lateral surfaces, of the vertical column. After being milled, a machined surface of the vertical column forms a reference surface for mounting the guide rail plate, and the machined surface is of a flatness of less than or equal to 0.1 mm/m.

The vertical column is mounted at the operating side of the main body of the automobile tire changer through an upper connection seat and a lower connection seat, and the guide rail plate is mounted on the mounting reference surface of the vertical column.

The sliding body includes a steel channel as a main member, and an upper stopper, a lower stopper, a first lateral rib and a second lateral rib are welded onto the steel channel, dowel holes are provided in the middle of the sliding body, dowel grooves are arranged at upper and lower ends of the steel channel, the first lateral rib and the second lateral rib are each provided with a square convex dowel whose cross section matches with cross sections of the corresponding dowel hole and dowel groove of the steel channel. The first lateral rib is provided with a stopping dowel hole, and the upper stopper and the lower stopper are each provided with a square convex dowel whose cross section matches with a cross section of the corresponding stopping dowel hole.

A slider is mounted inside the sliding body and forms a friction pair together with the guide rail plate, the sliding body is connected to a piston rod of the longitudinal actuator through a thrust joint bearing, and a lower end of the longitudinal actuator is hinged to a bottom of the vertical column through a lug shaft.

The upper laterally-swinging guide sleeve is hinged to the upper end of the sliding body through an upper joint shaft, the lower laterally-swinging guide sleeve is hinged to the lower end of the sliding body through a lower joint shaft. The upper laterally-swinging guide sleeve and the lower laterally-swinging guide sleeve are each provided with a claw wrench whose working surface matches with a working surface of the corresponding upper stopper or lower stopper. The upper guide column is mounted within a square hole of the upper laterally-swinging guide sleeve, a front end of the upper guide column is connected to the upper bead separator. The lower guide column is mounted within a square hole of the lower laterally-swinging guide sleeve, a front end of the lower guide column is connected to the lower bead separator, and a rear end of the lower guide column is connected to a rear bracket. The rear bracket is connected to a piston rod of the lateral actuator, the other end of the lateral actuator is connected to a front bracket, and the front bracket is arranged at a lower surface of the lower laterally-swinging guide sleeve.

An upper spherical hinge plate of a spherical hinge plate push-pull flexible shaft is mounted within an upper bracket for the flexible shaft, the upper bracket for the flexible shaft is mounted at a lateral surface of the upper laterally-swinging guide sleeve. An upper core spindle of the spherical hinge plate push-pull flexible shaft is connected to the upper guide column, a lower core spindle of the spherical hinge plate push-pull flexible shaft is mounted at a lateral surface of the lower laterally-swinging guide sleeve. A lower spherical hinge plate of the spherical hinge plate push-pull flexible shaft is mounted within a lower bracket for the flexible shaft, the lower bracket for the flexible shaft is mounted at a lateral surface of the rear bracket. A rod end ball joint bearing at an upper end of the spherical hinge plate push-pull flexible shaft is connected to the upper guide column, a rod end ball joint bearing at a lower end of the spherical hinge plate push-pull flexible shaft is mounted at a lateral surface of the lower laterally-swinging guide sleeve, and the lower bracket for the flexible shaft is mounted at a lateral surface of the rear bracket.

A console is hinged to a support arm, the support arm is hinged to a flange mounted at the upper portion of the vertical column. The console consists of a handle, a front plate welding assembly, a rear cover plate welding assembly, a tapered gasket and a sunk screw.

Further, when an upper bead of the tire is operated using the assistant arm, the claw wrench of the upper tire pressing mechanism is locked with the upper stopper of the sliding body, so that the upper tire pressing mechanism is located at an operating position and the lower tire pressing mechanism is unlocked so as to be swung to a non-operating position, and when a lower bead of the tire is operated using the assistant arm, the claw wrench of the lower tire pressing mechanism is locked with the lower stopper of the sliding body, so that the lower tire pressing mechanism is located at an operating position and the upper tire pressing mechanism is unlocked so as to be swung to a non-operating position.

In order to laterally move the upper bead separator and the lower bead separate simultaneously, the spherical hinge plate push-pull flexible shaft is used in the embodiments of the present disclosure. As compared with a fixed push-pull flexible shaft, the spherical hinge plate push-pull flexible shaft is provided with two spherical hinge structures, i.e., the two spherical hinge structures are provided at both ends of a protective tube of the fixed push-pull flexible shaft, respectively. The upper and lower core spindles are exposed at the two ends of the protective tube, and the two rod end ball joint bearings are in threaded connected with front ends of the upper and lower core spindles, respectively, so that the upper and lower core spindles can be pushed and pulled within the protective tube. An exposed bolt head of the rod end ball joint bearing functions as to facilitate the connection with a part that moves synchronously with the joint bearing, and the spherical hinge plate functions as to allow the protective tube of the push-pull flexible shaft to be swung at an angle of ±10°, so that the flexible shaft is not affected by a bending force when the upper tire pressing mechanism or the lower tire pressing mechanism is swung outwardly to be in a non-locking state.

In order to overcome the defects of the guide rail member for an existing assistant arm, the guide rail plate and the vertical column are machined separately, and then assembled into the combined guide rail.

The guide rail plate is a bar-like plate formed by roughly machining, tempering and then semifinishing 45# steel, and two lateral surfaces of the guide rail plate are subjected to high-frequency quenching to provide the rigidity of HRC42 to increase the working life, and then ground to provide the straightness and flatness of less than or equal to 0.05 mm/m.

The vertical column includes the square or rectangular steel tube as the anti-buckling beam, the small disc-shaped protrusions are provided at a front surface of the vertical column by welding, and the protrusions are milled so as to form the mounting reference surface for the guide rail plate. These small protrusions are each of a small area and require less welding spots and short welding seams, so the post-welding deformation of the vertical column is small. In addition, the accuracy of the rectangular steel tube is not highly required, i.e., a base metal for the welding is allowed to have a certain profile error, and this profile error may be eliminated through post-welding machining, so as to enable the flatness of the mounting reference surface of the vertical column to be less than or equal to 0.1 mm/m.

Alternatively, the sliding body is a forging member, which provided with the upper stopper, the lower stopper, the first lateral rib and the second lateral rib, the slider is mounted inside the sliding body.

Due to an assembly error for a guiding structure of the combined guide rail, there certainly exists an assembly error between the sliding body that moves along the guide rail plate and the actuator that drives the sliding body. Hence, the joint bearing is mounted between the sliding body and the piston rod of the actuator, so as to eliminate the assembly error through a self-alignment function of the joint bearing.

The members are connected to each other as follows.

The vertical column is mounted at the operating side of the main body of the tire changer through the upper and the lower connection seats, and the guide rail plate is mounted at the mounting reference surface of the vertical column.

The slider is arranged inside the sliding body and forms a friction pair together with the guide rail plate, the sliding body is connected to the piston rod of the longitudinal actuator through the joint bearing, and the lower end of the longitudinal actuator is hinged to the bottom of the vertical column through the lug shaft.

The upper laterally-swinging guide sleeve is hinged to the upper end of the sliding body through the upper joint shaft, and the lower laterally-swinging guide sleeve is hinged to the lower end of the sliding body through the lower joint shaft.

The sliding body includes the upper stopper and the lower stopper as convex stopper. The operating surfaces of the two claw wrenches of the upper laterally-swinging guide sleeve and the lower laterally-swinging guide sleeve match with the operating surfaces of the upper stopper and the lower stopper of the sliding body, respectively.

The first micro-motion cylinder and the upper cylinder cover are arranged at a lower surface of the upper laterally-swinging guide sleeve, the first locking plate is arranged at a rear end of the upper laterally-swinging guide sleeve, the first micro-motion cylinder is connected to a surface of a lower portion of the first locking plate, the first return spring is connected to the opposite surface of the lower portion of the first locking plate. The upper guide column passes through the square holes in the upper laterally-swinging guide sleeve and the first locking plate, and the front end of the upper guide column is connected to the upper bead separator.

The second micro-motion cylinder and the lower cylinder cover are arranged at an upper surface of the lower laterally-swinging guide sleeve, the second locking plate is arranged at a rear surface of the lower laterally-swinging guide sleeve. The second micro-motion cylinder is connected to a surface of a lower portion of the second locking plate, the second return spring is connected to the opposite surface of the lower portion of the second locking plate. The lower guide column passes through the square holes in the lower laterally-swinging guide sleeve and the second locking plate, the front end of the lower guide column is connected to the lower bead separator, the rear end of the lower guide column is connected to the rear bracket, the rear bracket is connected to the piston rod of the lateral actuator, the other end of the lateral actuator is connected to the front bracket, and the front bracket is arranged at the lower surface of the lower laterally-swinging guide sleeve.

The upper spherical hinge plate of the spherical hinge plate push-pull flexible shaft is arranged within the upper bracket for the flexible shaft, the upper bracket for the flexible shaft is arranged at the lateral surface of the upper laterally-swinging guide sleeve. The rod end ball joint bearing at the upper end of the spherical hinge plate push-pull flexible shaft is connected to the upper guide column, the rod end ball joint bearing at the lower end of the spherical hinge plate push-pull flexible shaft is arranged at the lateral surface of the lower laterally-swinging guide sleeve. The lower spherical hinge plate of the spherical hinge plate push-pull flexible shaft is arranged within the lower bracket for the flexible shaft, and the lower bracket for the flexible shaft is arranged at the lateral surface of the rear bracket.

The console is hinged to the support arm, the support arm is hinged to the flange, the flange is arranged at the upper portion of the vertical column, and the console is swingable horizontally within a certain range.

The console consists of a handle, a front plate welding assembly, a rear cover plate welding assembly, a tapered gasket and a sunk screw. The tapered gasket, i.e., a so-called fisheye gasket, is used in combination with the sunk screw so as to provide the console with a smooth outer surface, thereby to improve the contact comfort level and the appearance thereof.

In another aspect, the present disclosure provides in one embodiment a method for manufacturing principal parts of the assistant arm for the automobile tire changer, which includes methods for manufacturing the combined guide rail, the sliding body and the console. The details thereof will be described in the following "detailed description".

The bead separator used in the embodiments of the present disclosure is known in the art, the spherical hinge plate push-pull flexible shaft and the micro-motion cylinder are commonly used in vehicles, and the tapered gasket is a standard member for vehicles.

According to the embodiments of the present disclosure, due to the one-for-two structure, it is able to provide the assistant arm with a simple structure, complete functions and reliable performances, to facilitate the operation and maintenance, and to reduce the production cost thereof.

Figure 1:
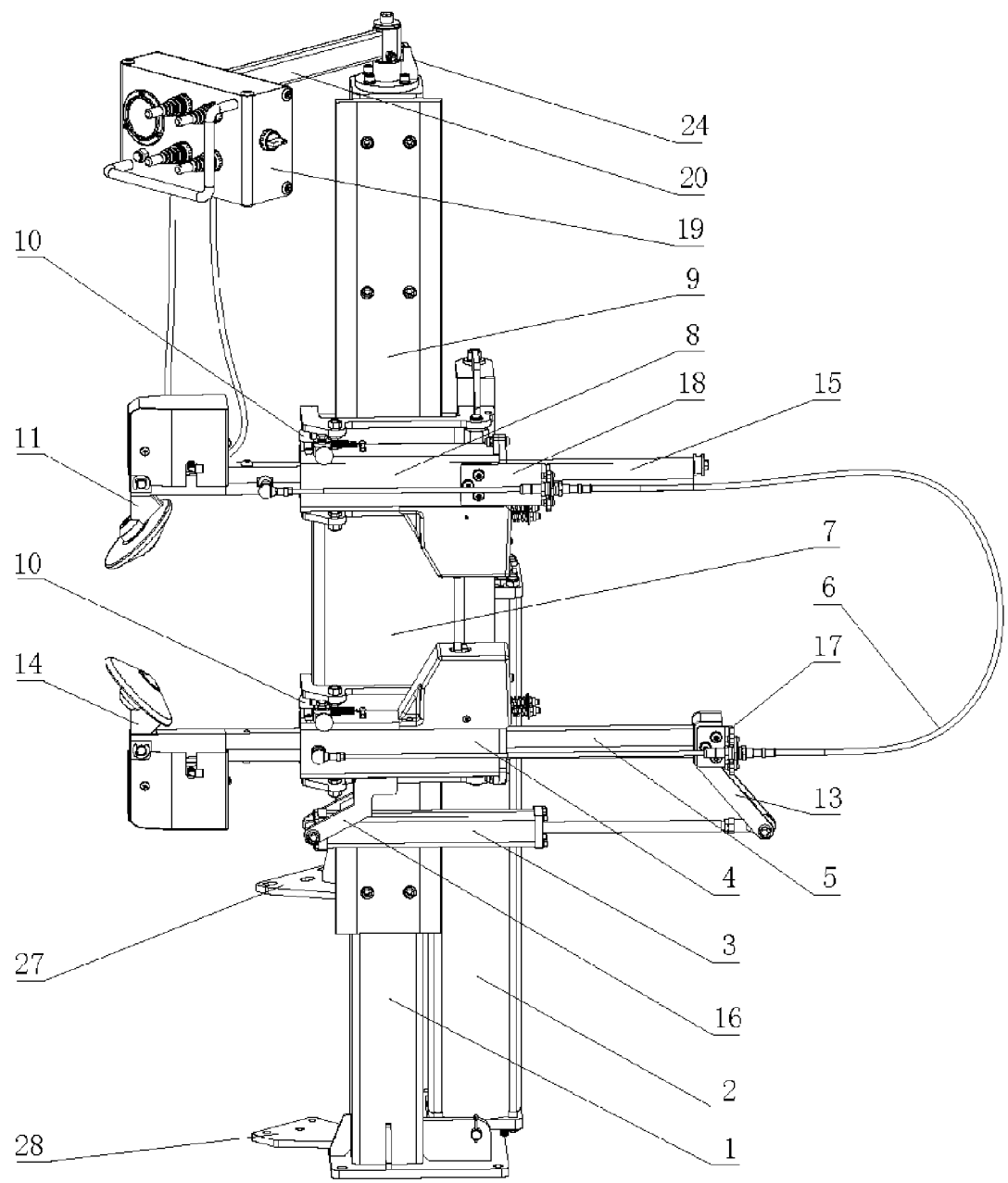
FIG. 1 is a front view of an assistant arm according to one embodiment of the present disclosure.

REFERENCE SIGN LIST 1 vertical column
1-1 front protrusion
1-2 lower protrusion
1-3 anti-buckling beam
2 longitudinal actuator
3 lateral actuator
4 lower laterally-swinging guide sleeve
5 lower guide column
6 spherical hinge plate push-pull flexible shaft
6-1 upper core spindle
6-2 upper spherical hinge plate
6-3 lower core spindle
6-4 lower spherical hinge plate
6-5 rod end ball joint bearing
7 sliding body
7-1 upper stopper
7-2 lower stopper
7-3 first lateral rib
7-4 second lateral rib
7-5 steel groove
8 upper laterally-swinging guide sleeve
9 guide rail plate
10 claw wrench
11 upper bead separator
12 upper joint shaft
13 rear bracket
14 lower bead separator
15 upper guide column
16 front bracket
17 lower bracket for flexible shaft
18 upper bracket for flexible shaft
19 console
20 support arm
21 lower joint shaft
22 lug shaft
23 thrust joint bearing
24 flange
25 slider
26 wheel
27 upper connection seat
28 lower connection seat
29 rod end joint bearing
30 upper cylinder cover
31 return spring
32 locking plate
33 micro-motion cylinder
34 handle
35 front plate welding assembly
35-1 front base plate
35-2 first angular rib
35-3 first nut
36 tapered gasket
37 rear cover plate welding assembly
37-1 rear base plate
37-2 second angular rib
37-3 second nut
38 sunk screw
39 lower cylinder cover
100 main body of automobile tire changer

DETAILED DESCRIPTION

The present disclosure will be described hereinafter in conjunction with the drawings and embodiments. The following embodiments are for illustrative purposes only, but shall not be used to limit the scope of the present disclosure.

Figure 5:
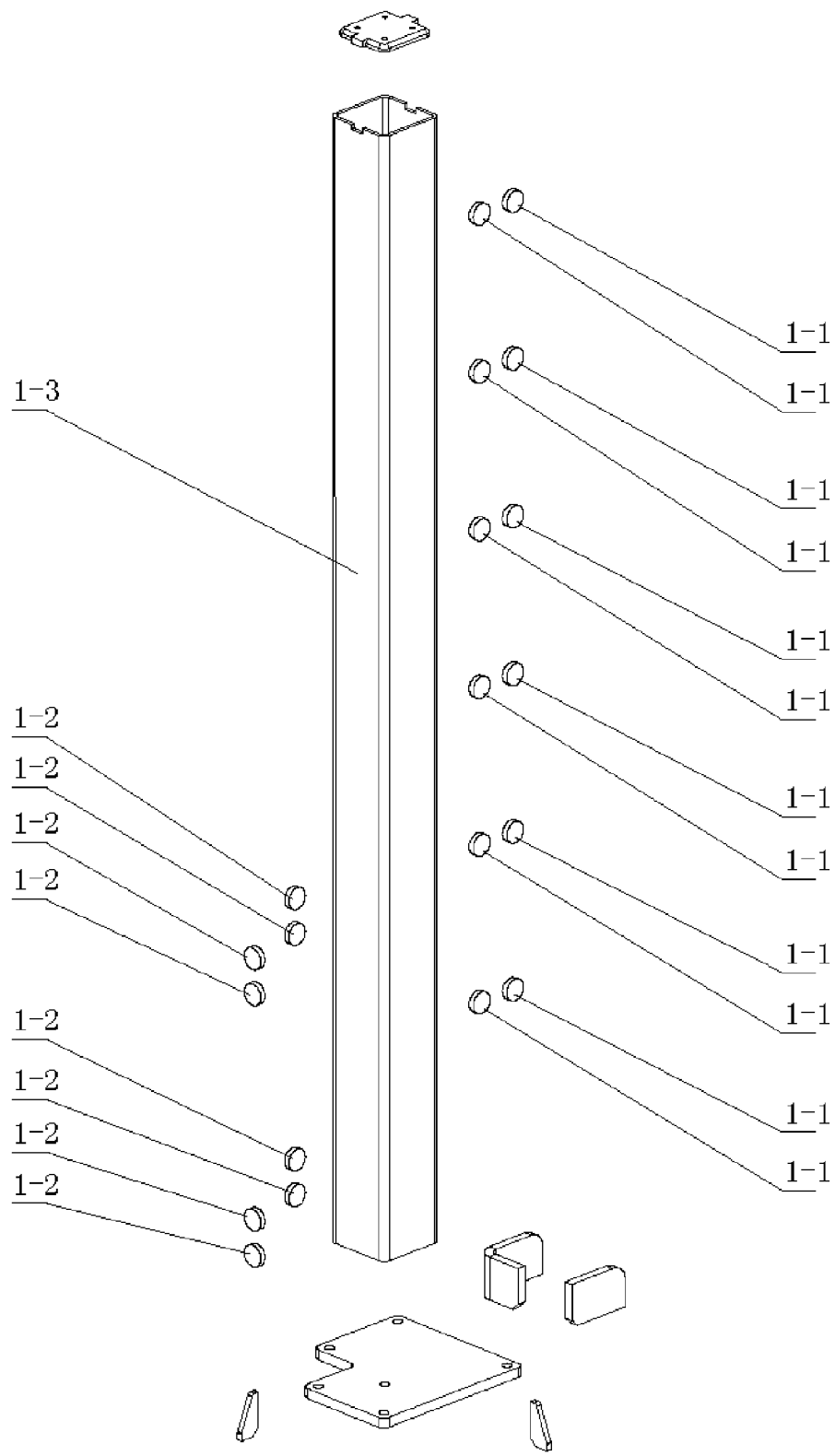
FIG. 5 is an exploded view of a vertical column according to one embodiment of the present disclosure.

A vertical column 1 includes a square or a rectangular tube as an anti-buckling beam 1-3, several small disc-shaped front protrusions 1-1 are welded onto an upper portion of the vertical column, and several small disc-shaped lower protrusions 1-2 are welded onto a lower portion, and at lateral surfaces, of the vertical column. After being milled, a machined surface of the vertical column 1 forms a reference surface for mounting a guide rail plate 9, and the reference surface is of a flatness of less than or equal to 0.1 mm/m, as shown in FIG. 5.

Figure 3:
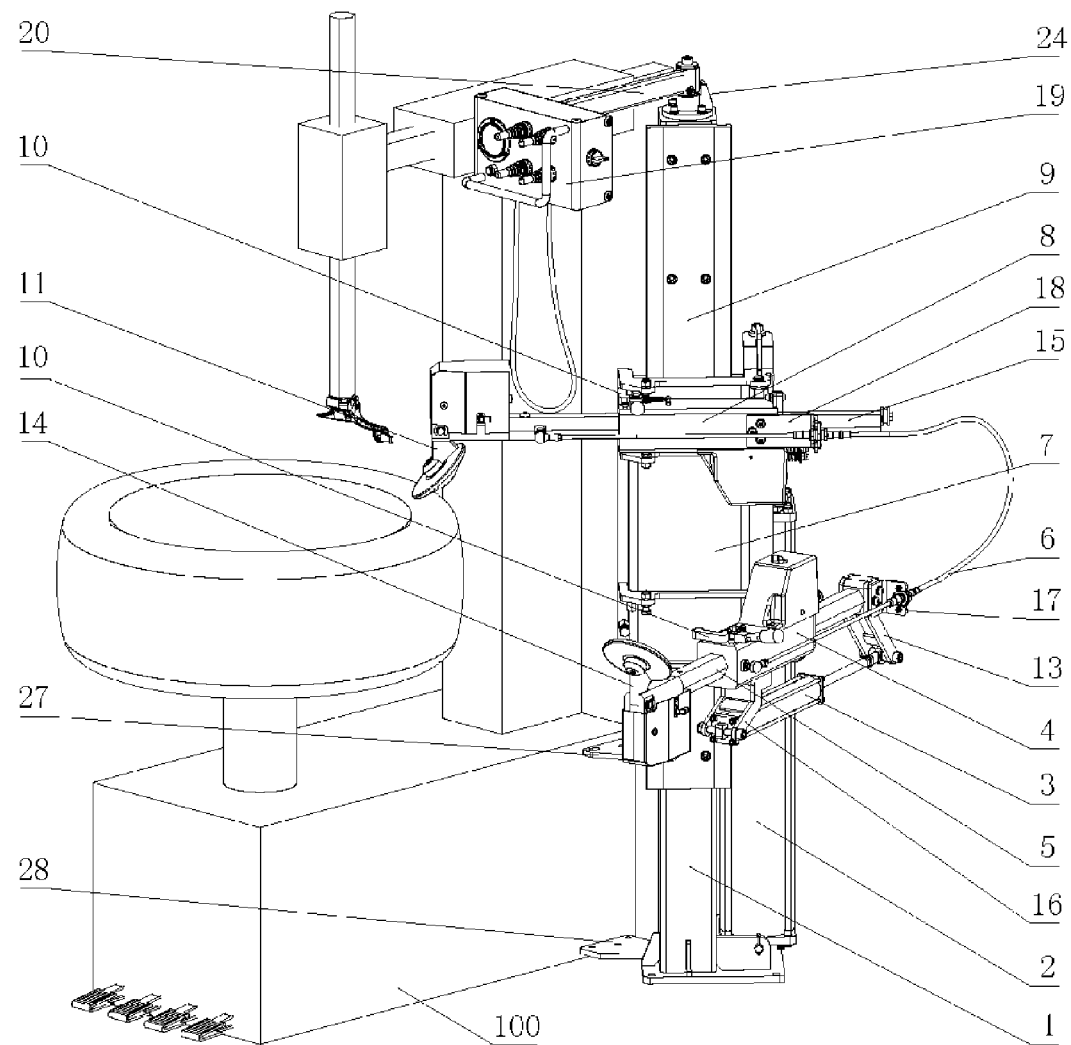
FIG. 3 is a schematic view showing an upper tire pressing mechanism according to one embodiment of the present disclosure.

The vertical column 1 is mounted at an operating side of a main body 100 of a tire changer through an upper connection seat 27 and a lower connection seat 28, as shown in FIG. 3.

Figure 6:
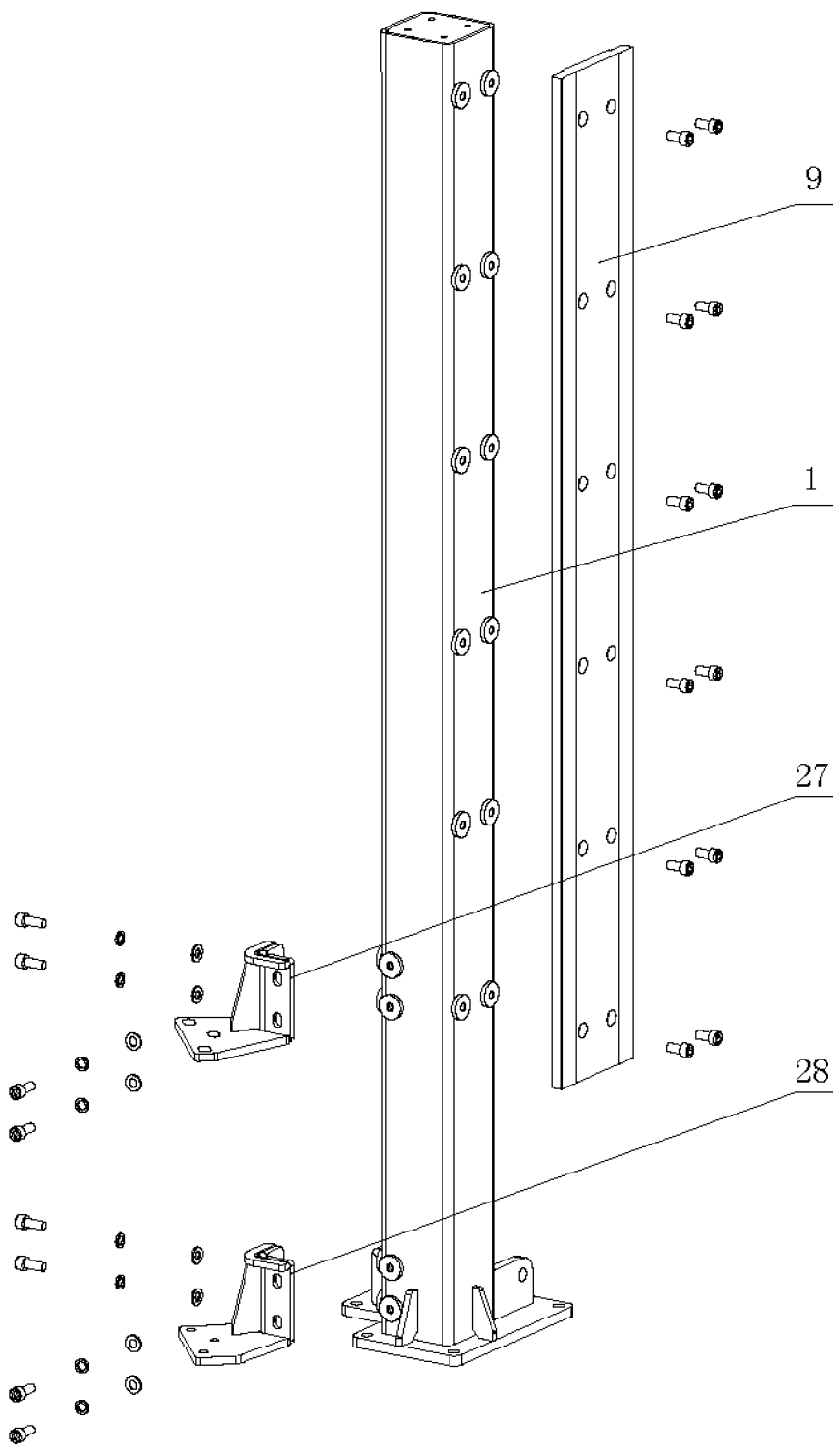
FIG. 6 is a schematic view showing the connection mode for the vertical column with a guide rail plate, an upper connection seat and a lower connection seat according to one embodiment of the present disclosure.

As shown in FIG. 6, the guide rail plate 9 is mounted to the mounting reference surface of the vertical column 1.

Figure 8:
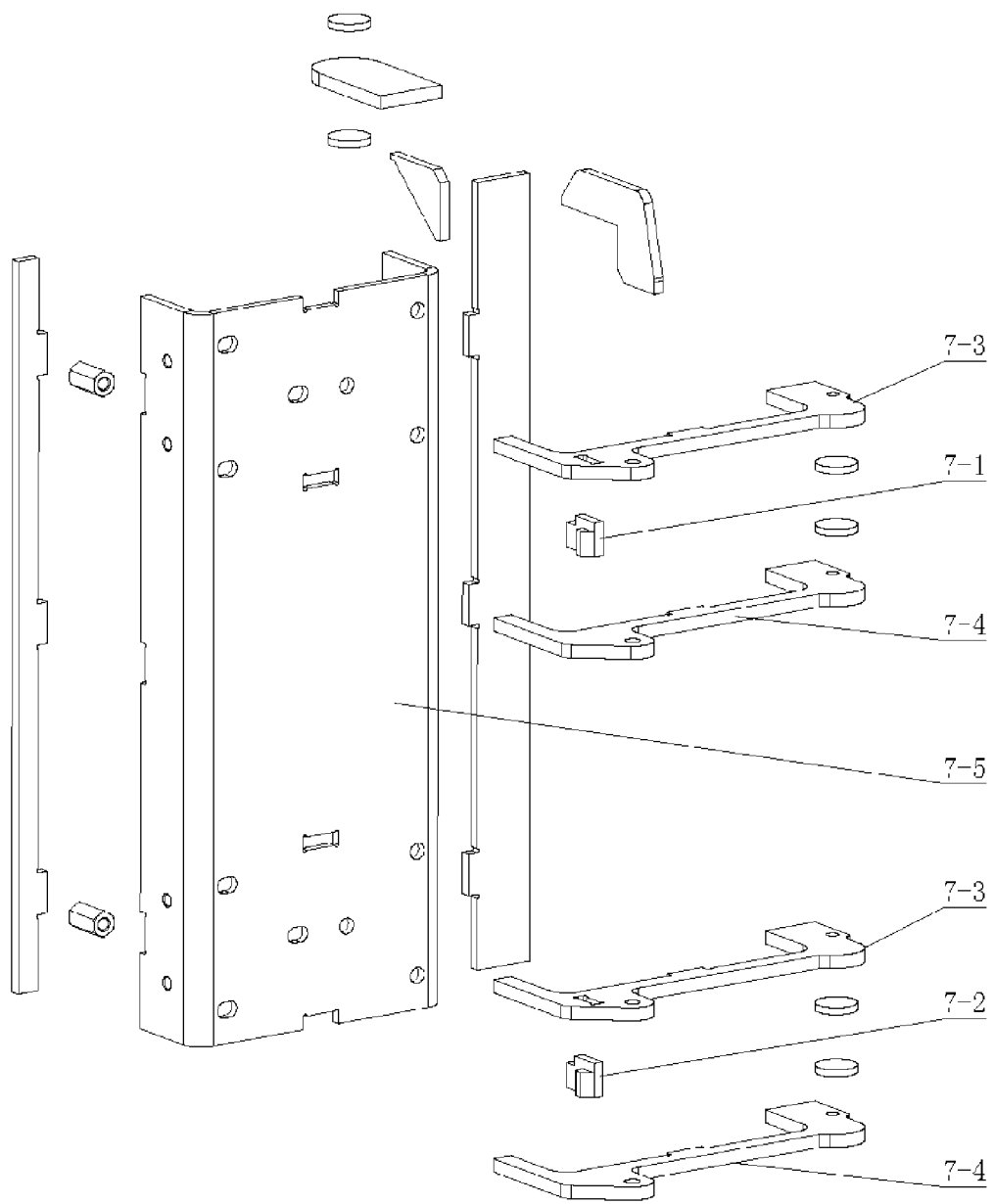
FIG. 8 is an exploded view of the sliding body according to one embodiment of the present disclosure.

A sliding body 7 includes a steel channel 7-5 as a main member, and an upper stopper 7-1, a lower stopper 7-2, a-first lateral rib 7-3 and a second lateral rib 7-4 are welded onto the steel channel 7-5, dowel holes are provided in the middle of the steel channel 7-5, and dowel grooves are arranged at upper and lower ends of the steel channel 7-5, the first lateral rib 7-3 and the second lateral rib 7-4 are each provided with a square convex dowel whose cross section matches with cross sections of the corresponding dowel hole and dowel groove of the steel channel 7-5, the first lateral rib 7-3 is provided with a stopping dowel hole, and the upper stopper 7-1 and the lower stopper 7-2 are each provided with a square convex dowel whose cross section matches with a cross section of the corresponding stopping dowel hole, as shown in FIG. 8.

Figure 7:
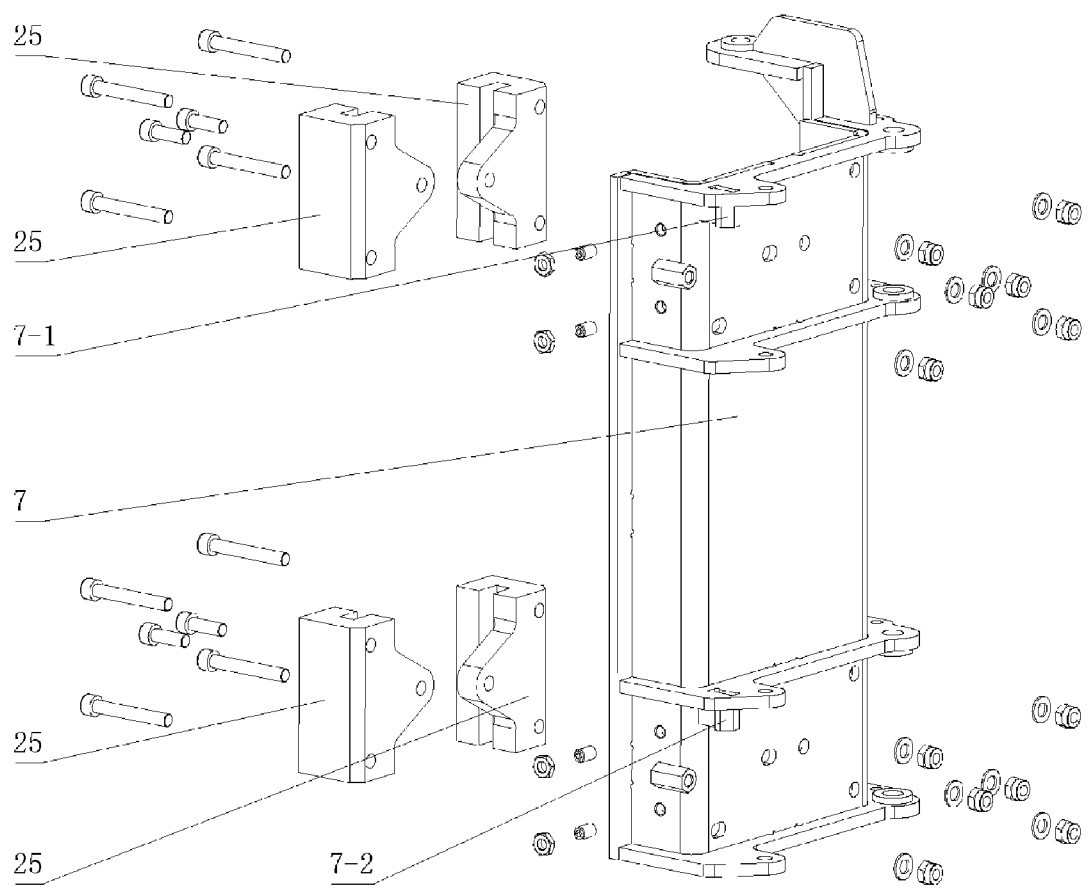
FIG. 7 is a schematic view showing the connection mode for a sliding body and a slider according to one embodiment of the present disclosure.

Sliders 25 are mounted inside the sliding body 7 and forms a friction pair together with the guide rail plate 9, the sliding body 7 includes the upper stopper 7-1 and the lower stopper 7-2 as convex stopper, as shown in FIG. 7.

Figure 2:
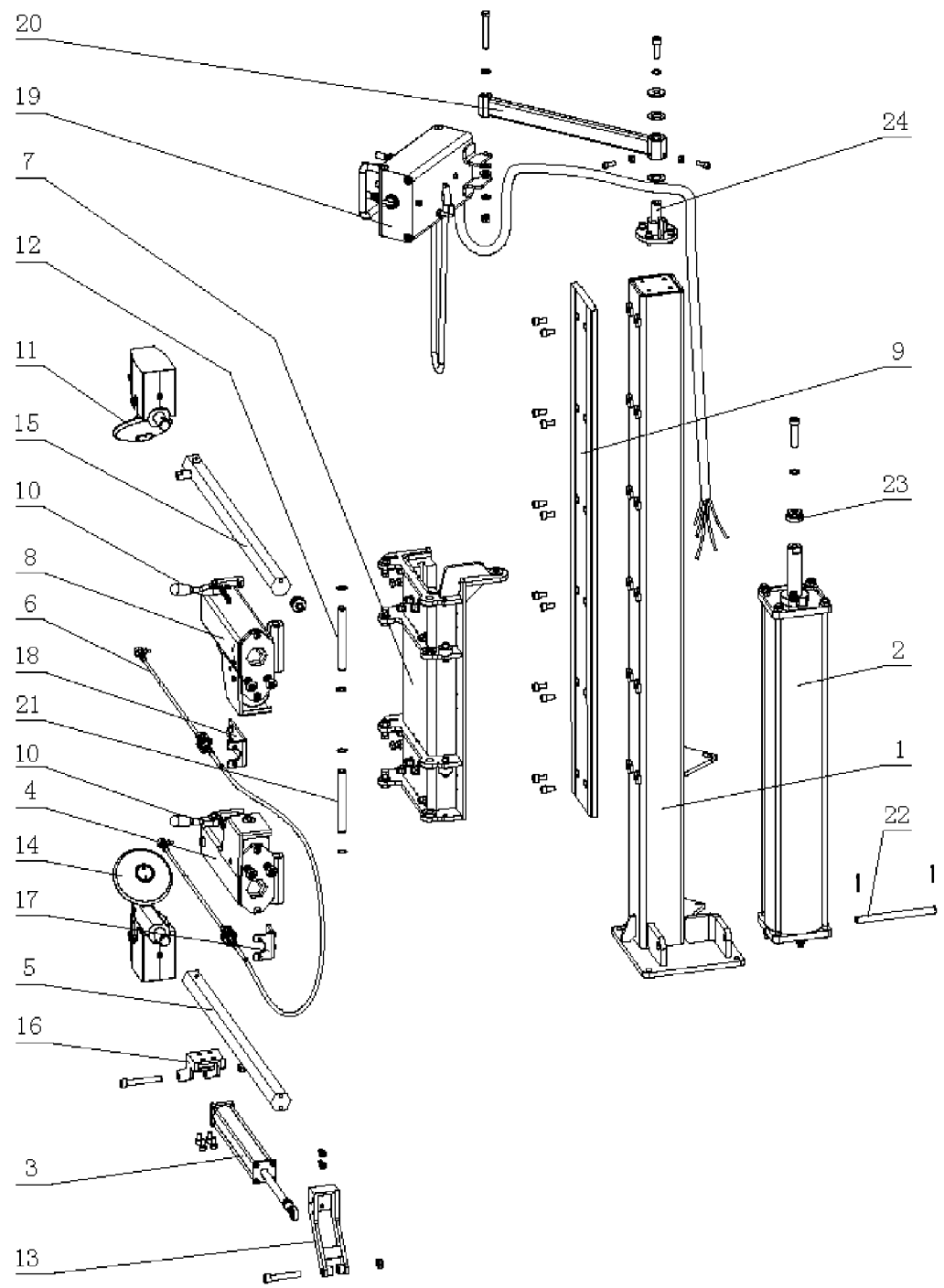
FIG. 2 is an exploded view of the assistant arm according to one embodiment of the present disclosure.

A lower end of a longitudinal actuator 2 is hinged to a bottom of the vertical column 1 through a lug shaft 22, as shown in FIG. 2.

An upper portion of the sliding body 7 is hinged to an upper laterally-swinging guide sleeve 8 through an upper joint shaft 12, and a lower portion of the sliding body 7 is hinged to a lower laterally-swinging guide sleeve 4 through a lower joint shaft 21, as shown in FIG. 2.

Figure 9:
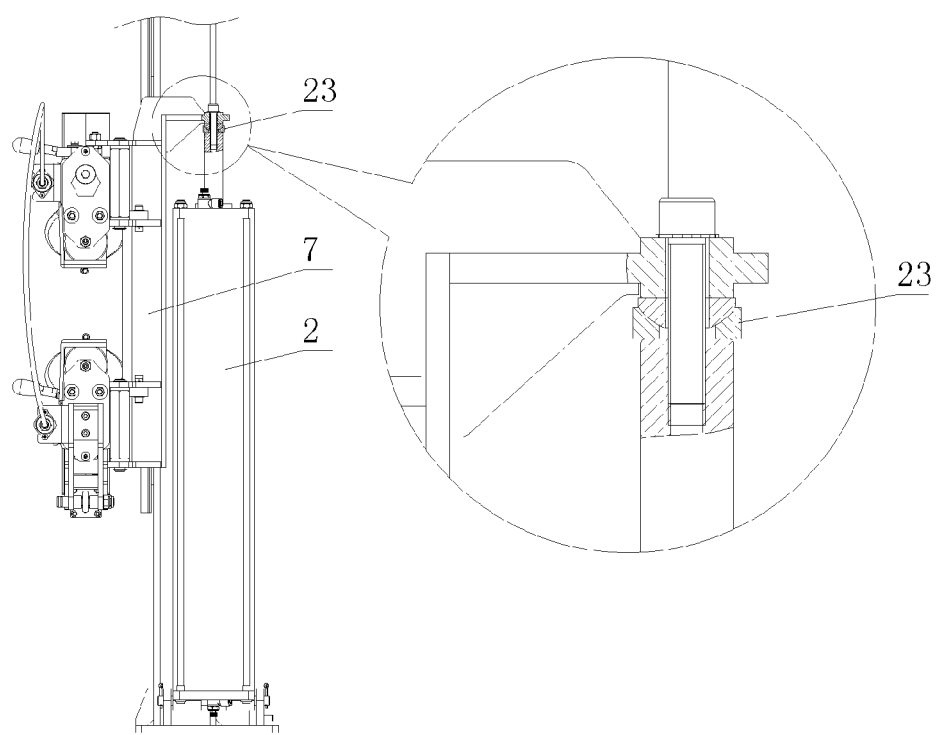
FIG. 9 is a schematic view showing the connection mode for the sliding body with a thrust joint bearing and a longitudinal actuator according to one embodiment of the present disclosure.
Figure 10:
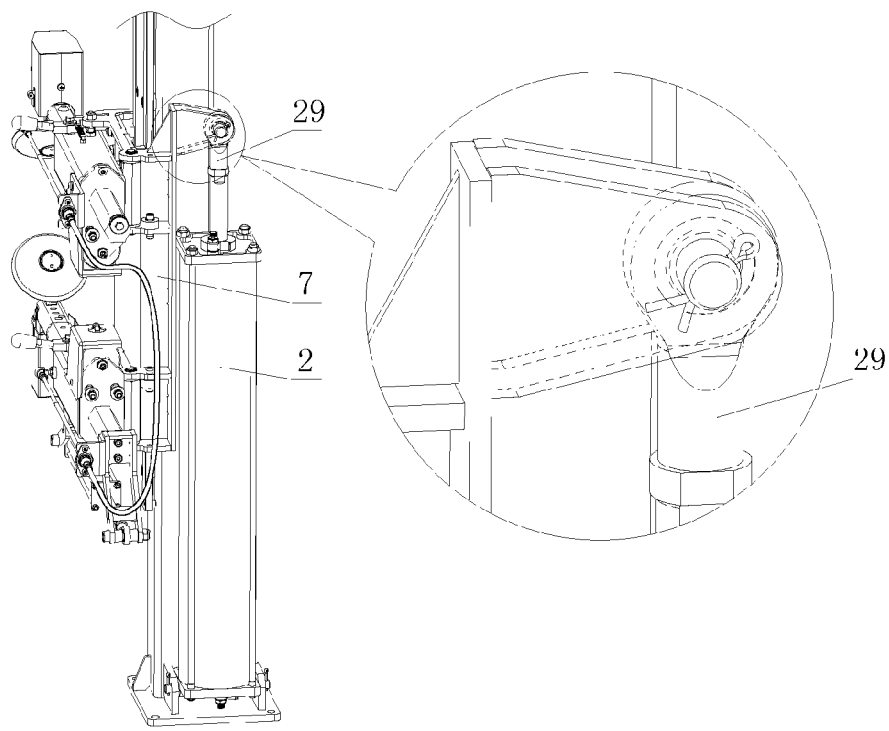
FIG. 10 is a schematic view showing the connection mode for the sliding body with a rod end joint bearing and the longitudinal actuator according to one embodiment of the present disclosure.
Figure 13:
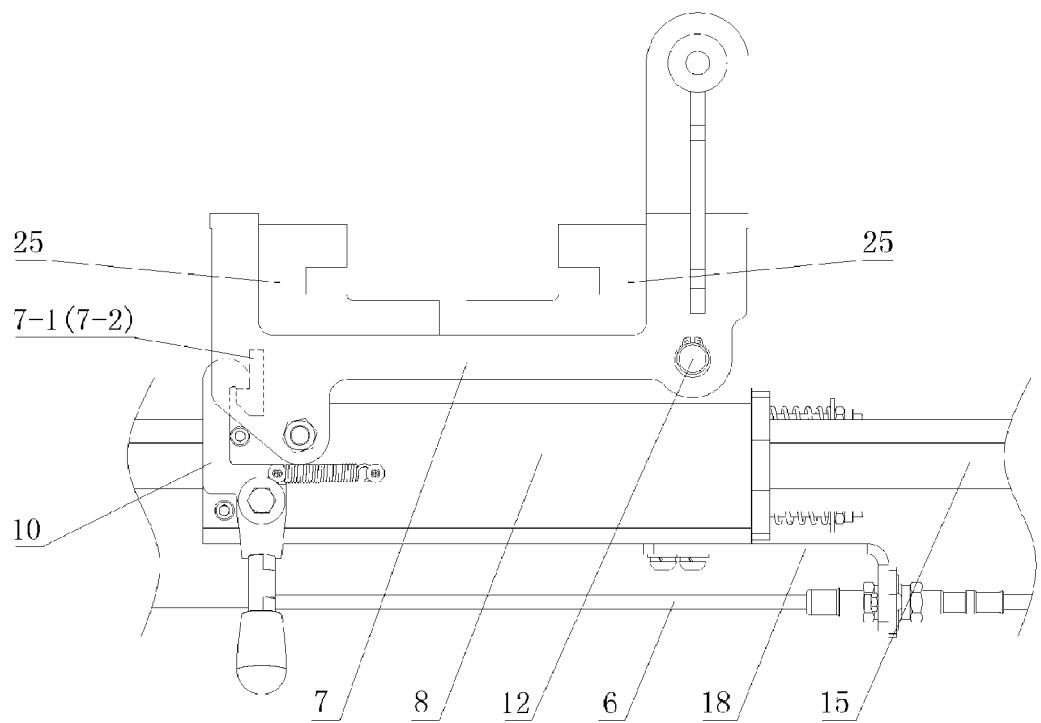
FIG. 13 is a schematic view showing the situation where a claw wrench is locked with the sliding body according to one embodiment of the present disclosure.
Figure 14:
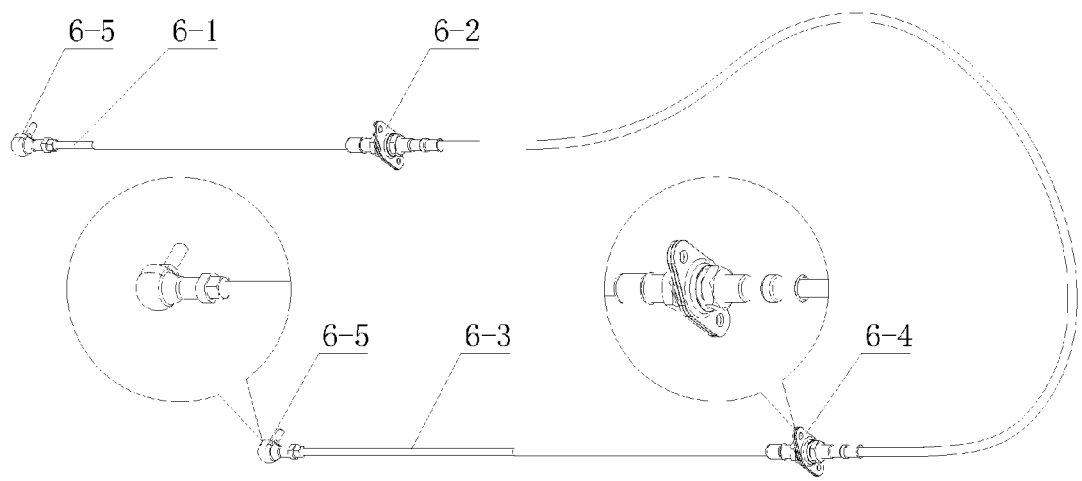
FIG. 14 is a schematic view showing the structure of a spherical hinge plate push-pull flexible shaft according to one embodiment of the present disclosure.
Figure 15:
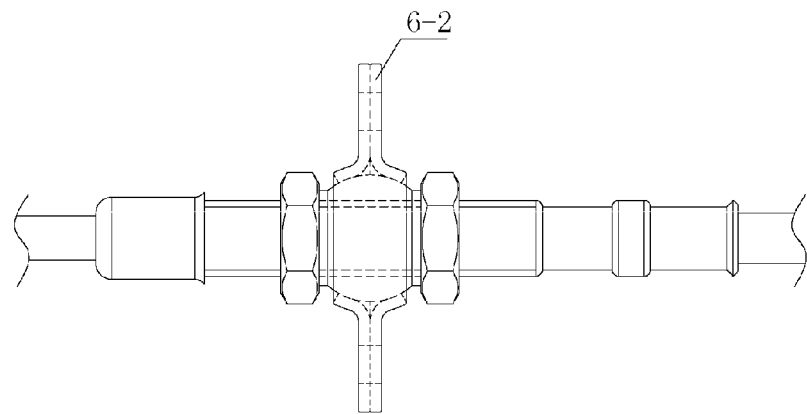
FIG. 15 is a schematic view showing a spherical hinge structure of the spherical hinge plate push-pull flexible shaft according to one embodiment of the present disclosure.

A claw wrench 10 is arranged at an upper surface of each of the upper laterally-swinging guide sleeve 8 and the lower laterally-swinging guide sleeve 4, as shown in FIGS. 9 and 10. Working surfaces of the two claw wrenches 10 match with working surfaces of the upper stopper 7-1 and lower stopper 7-2 of the sliding body 7, respectively. Hence, during the hooking operation, the two claw wrenches 10 may be locked with the upper stopper 7-1 and the lower stopper 7-2 of the sliding body 7, respectively, as shown in FIG. 13.

Figure 11:
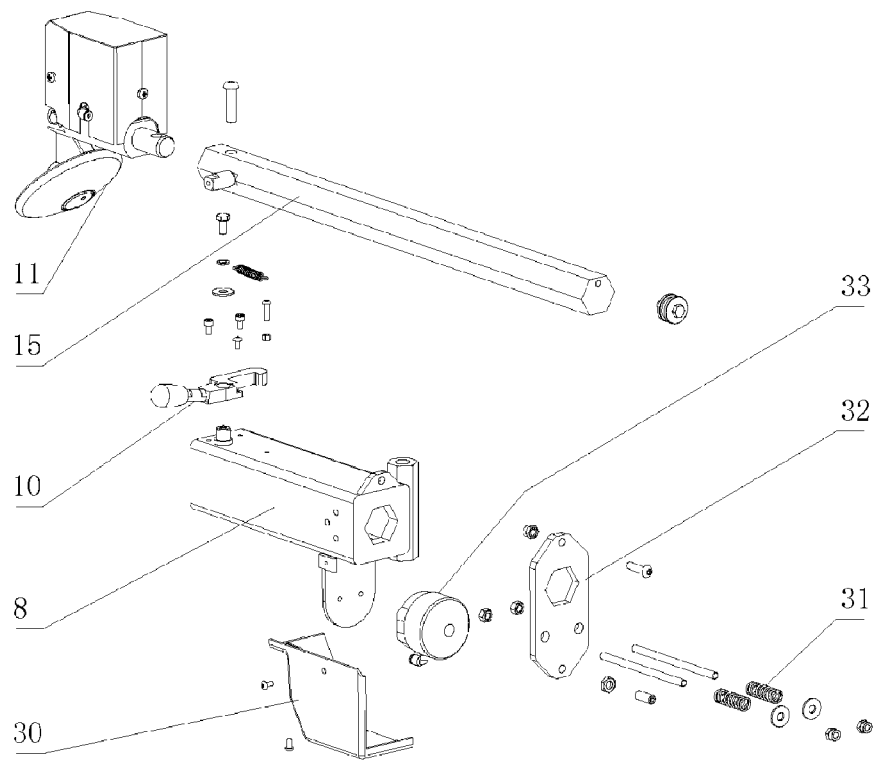
FIG. 11 is an exploded view of the upper tire pressing mechanism according to one embodiment of the present disclosure.

A first micro-motion cylinder 33 and an upper cylinder cover 30 are arranged at a lower surface of the upper laterally-swinging guide sleeve 8. A first locking plate 32 is arranged at a rear end of the upper laterally-swinging guide sleeve 8, the first micro-motion cylinder 33 is connected to a surface of a lower portion of the first locking plate 32, a first return spring 31 is connected to the opposite surface of the lower portion of the first locking plate 32, an upper guide column 15 passes through square holes in the upper laterally-swinging guide sleeve 8 and the first locking plate 32, and a front end of the upper guide column 15 is connected to an upper bead separator 11, as shown in FIG. 11.

Figure 12:
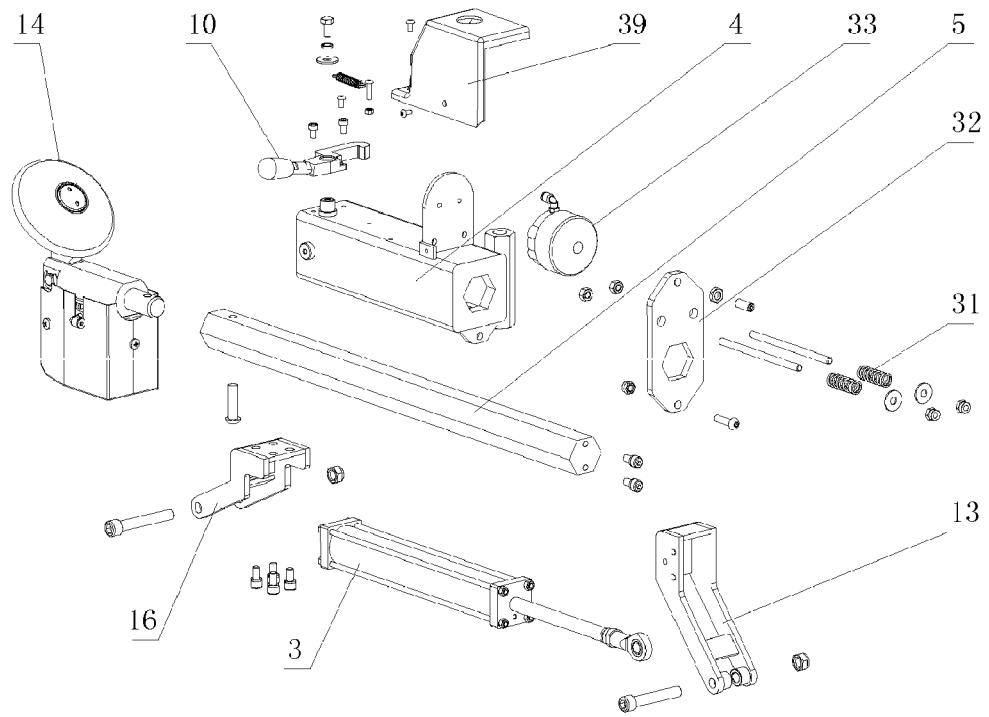
FIG. 12 is an exploded view of the lower tire pressing mechanism and a lateral actuator according to one embodiment of the present disclosure.

A second micro-motion cylinder 33 and a lower cylinder cover 39 are arranged at an upper surface of the lower laterally-swinging guide sleeve 4. A second locking plate 32 is arranged at a rear surface of the lower laterally-swinging guide sleeve 4, the second micro-motion cylinder 33 is connected to a lower portion of the second locking plate 32. A second return spring 31 is connected to an opposite surface of the second locking plate 32, a lower guide column 5 passes through square holes in the lower laterally-swinging guide sleeve 4 and the second locking plate 32, and a front end of the lower guide column 5 is connected to a lower bead separator 14. A rear end of the lower guide column 5 is connected to a rear bracket 13, the rear bracket 13 is connected to a piston rod of a lateral actuator 3, the other end of the lateral actuator 3 is connected to a front bracket 16, and the front bracket 16 is arranged at a lower surface of the lower laterally-swinging guide sleeve 4, as shown in FIG. 12.

Figure 16:
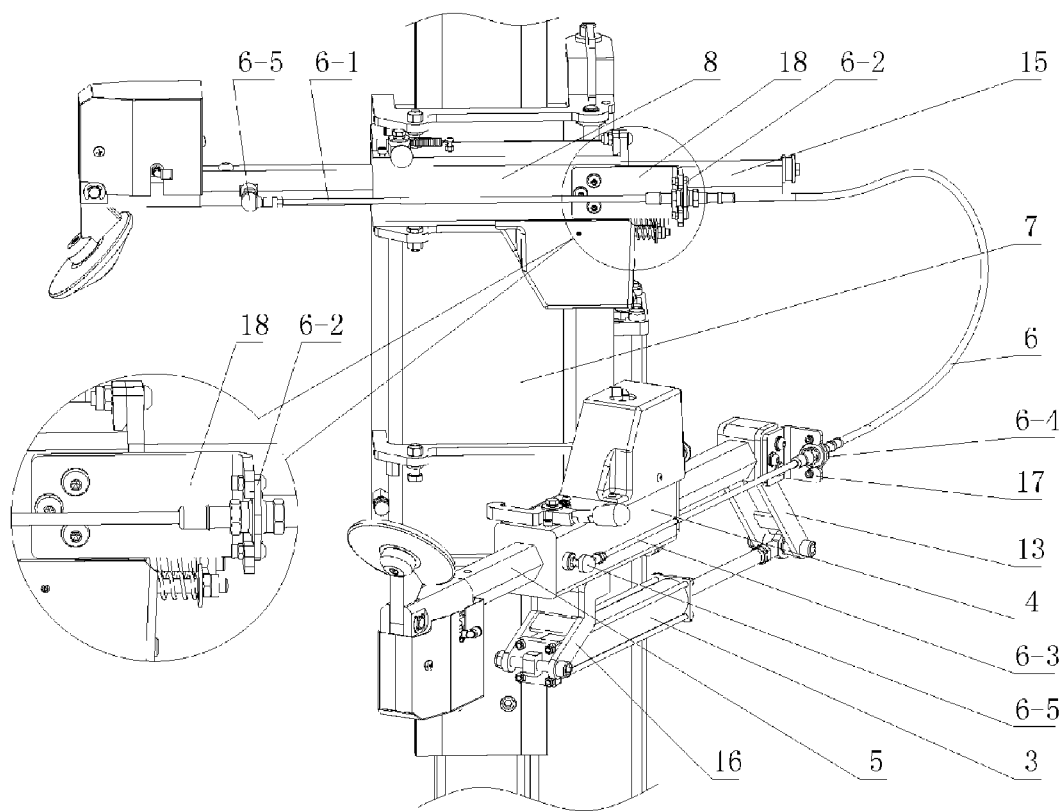
FIG. 16 is a schematic view showing a mounting state of the spherical hinge plate push-pull flexible shaft according to one embodiment of the present disclosure.

An upper spherical hinge plate 6-2 of a spherical hinge plate push-pull flexible shaft 6 is mounted within an upper bracket 18 for the flexible shaft. The upper bracket 18 for the flexible shaft is mounted at a lateral surface of the upper laterally-swinging guide sleeve 8, a rod end ball joint bearing 6-5 at an upper end of the spherical hinge plate push-pull flexible shaft 6 is connected to the upper guide column 15, a rod end ball joint bearing 6-5 at a lower end of the spherical hinge plate push-pull flexible shaft 6 is mounted at a lateral surface of the lower laterally-swinging guide sleeve 4. A lower spherical hinge plate 6-4 is mounted within a lower bracket 17 for the flexible shaft, and the lower bracket 17 for the flexible shaft is mounted at a lateral surface of the rear bracket 13, as shown in FIG. 16.

The present disclosure provides in one embodiment a method for manufacturing principal parts of an assistant arm for the automobile tire changer, which includes methods for manufacturing a combined guide rail, the sliding body 7 and a console 19. The vertical column 1 is a weldment, the front protrusions 1-1 are arranged at a front surface of the anti-buckling beam 1-3, the lower protrusions 1-2 are arranged at the lower portion of the anti-buckling beam 1-3 at its rear surface and the lateral surface, as shown in FIG. 5. After the post-welding machining, the front protrusions 1-1 are machined by milling so as to form the mounting reference surface for the guide rail plate 9 and then the threaded holes are formed in the front protrusions 1-1. Then the lower protrusions 1-2 are machined by milling to form the mounting reference surface for the upper connection seat 27 and the lower connection seat 28, and then the threaded holes are formed in the lower protrusions 1-2, as shown in FIG. 6.

When manufacturing the sliding body 7 by welding, the steel channel 7-5 is used as a main member. The dowel holes are provided in the middle of the steel channel 7-5, the dowel grooves are provided at the upper and lower ends of the steel channel 7-5, and the first lateral rib 7-3 and the second lateral rib 7-4 are each provided with a square convex dowel whose cross section matches with cross sections of the corresponding dowel hole and the dowel groove of the steel channel 7-5, so as to position the first lateral rib 7-3 and the second lateral rib 7-4 onto the steel channel 7-5 before the welding. Meanwhile, the first lateral rib 7-3 is provided with a stopping dowel hole, and the upper stopper 7-1 and the lower stopper 7-2 are each provided with a square convex dowel whose cross section matches with a cross section of the corresponding stopping dowel hole, so as to position the upper stopper 7-1 and the second stopper 7-2 onto the corresponding first lateral ribs 7-3, respectively, before the welding, as shown in FIG. 8.

More effectively than welding, the sliding body 7 may be manufactured by forging. To be specific, a blank may be forged at first, and then the sliding body 7 may be formed by a commonly-used mechanical cutting technique. Of course, the sliding body 7 manufactured by forging is of a structure and a shape identical to those of the sliding body manufactured by welding.

In the embodiments of the present disclosure, a joint bearing is mounted between the sliding body 7 and a piston rod of the longitudinal actuator 2, so as to eliminate an assembly error using a self-alignment function of the joint bearing.

Two methods are used in the present disclosure to eliminate the assembly error. One method includes eliminating the assembly error through a thrust joint bearing 23, a bearing race of which is connected to the sliding body 7 and a seat retainer of which is connected to the piston rod of the longitudinal actuator 2, as shown in FIG. 9. The other method includes eliminating the assembly error through a rod end joint bearing 29, an inner race of which is hinged to the sliding body 7 and a rod end of which is connected to the piston rod of the longitudinal actuator 2, as shown in FIG. 10. The two methods utilize the self-alignment function of the two kinds of joint bearings to eliminate the assembly error.

The console 19 is hinged to a support arm 20, the support arm 20 is hinged to a flange 24, the flange 24 is arranged at the upper portion of the vertical column 1, and the console 19 is swingable horizontally within a certain range, as shown in FIGS. 1 and 2.

Figure 17:
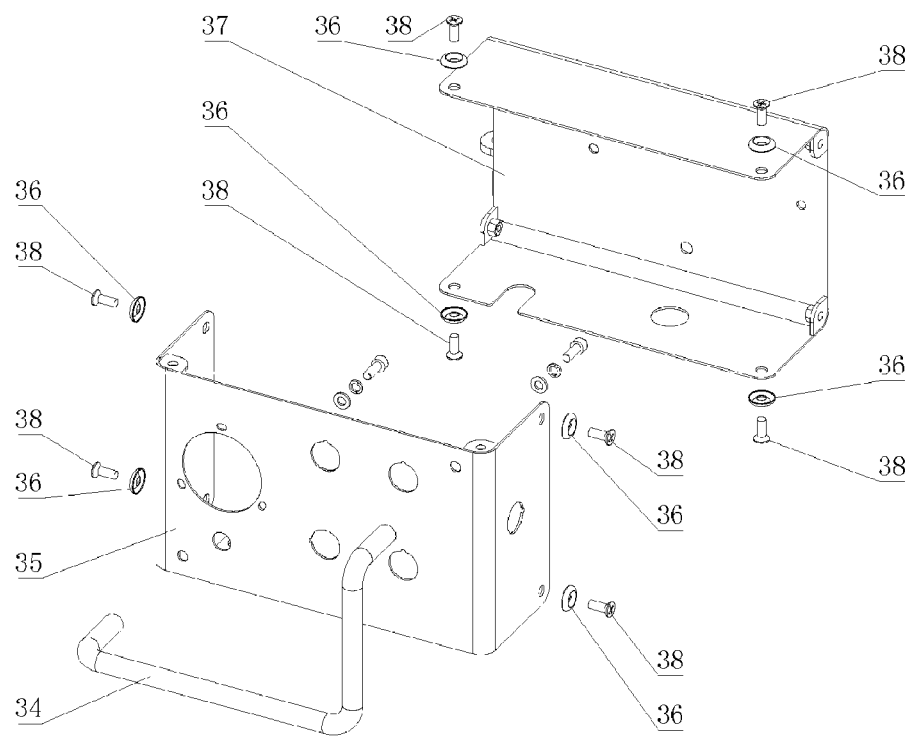
FIG. 17 is a schematic view showing a front plate welding assembly, a rear cover plate welding assembly and a handle for a console according to one embodiment of the present disclosure.
Figure 20:
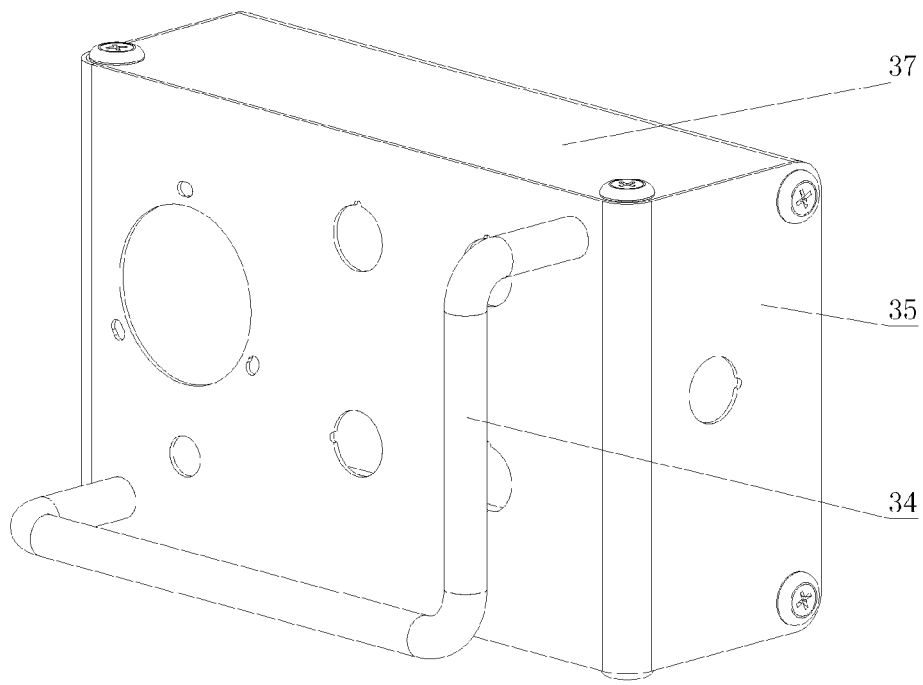
FIG. 20 is a schematic view showing the console after combination according to one embodiment of the present disclosure.

FIG. 20 shows the console 19. The console 19 consists of a handle 34, a front plate welding assembly 35, a rear cover plate welding assembly 37, a tapered gasket 36 and a sunk screw 38, as shown in FIG. 17.

The handle 34 is formed by pre-heating and bending cold-drawn round steel with a die. Threaded holes are provided at two ends of the handle 34, and then the handle 34 is polished and chrome-plated. Two gripping portions of the handle 34 are each curved at a right angle, so as to ensure that an operator can operate the console with one hand and change his hand posture rapidly, thereby to facilitate the operation and improve the contact comfort level.

Figure 18:
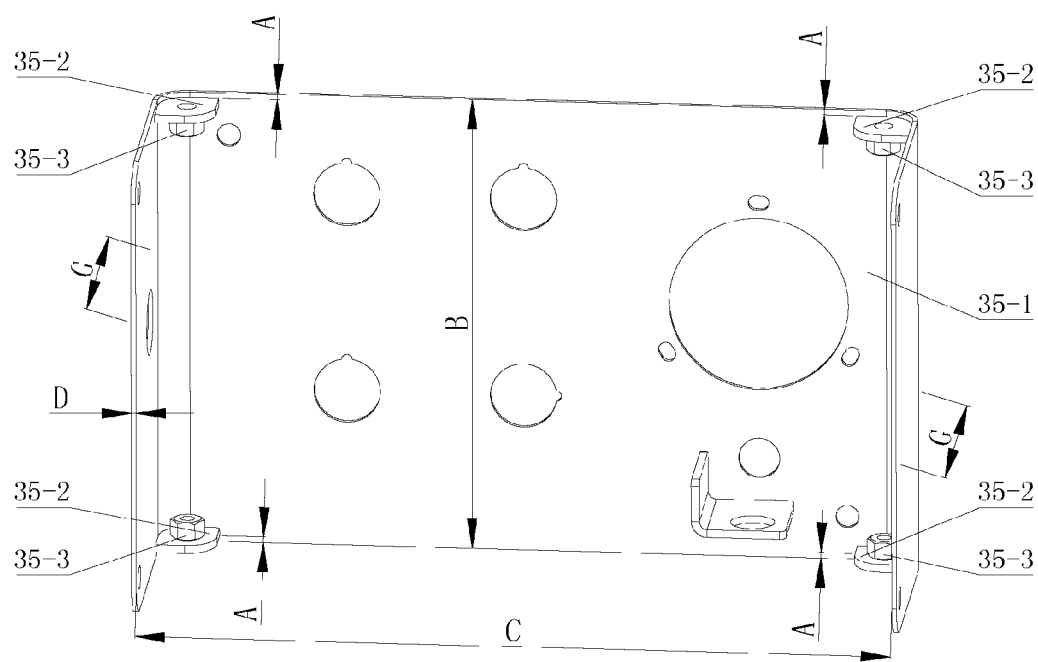
FIG. 18 is a schematic view showing the front plate welding assembly of the console according to one embodiment of the present disclosure.

As shown in FIG. 18, the front plate welding assembly 35 is a weldment. As its main member, a front base plate 35-1 is formed by laser cutting, and then bent by a bending machine to be of a U-shaped structure. Decorative chamfered portions of the front plate welding assembly 35 in a horizontal direction are formed by a dedicated upper die.

Figure 19:
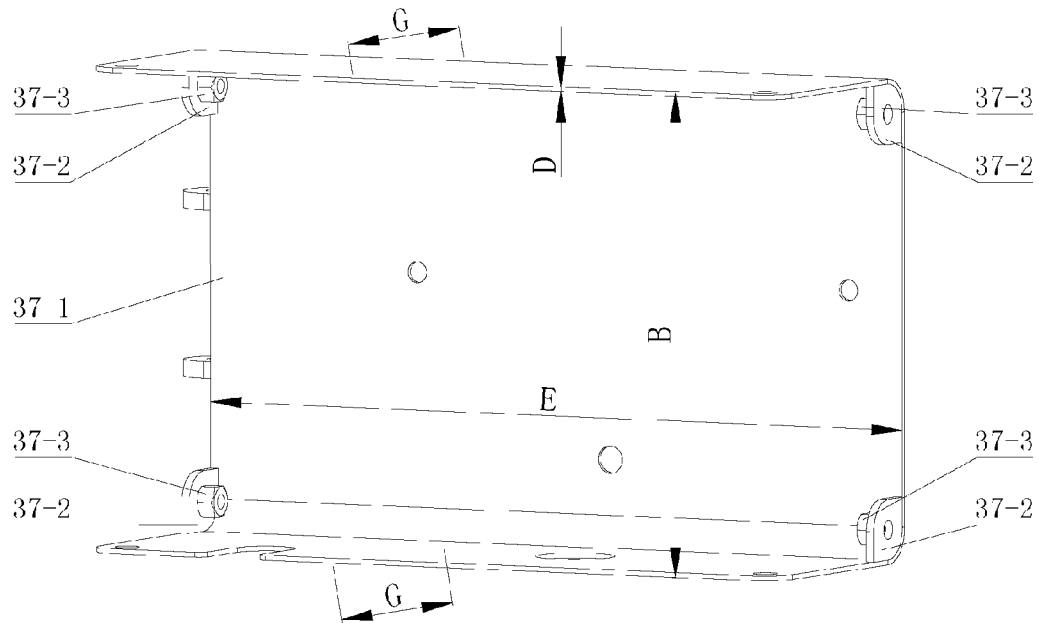
FIG. 19 is a schematic view showing the rear cover plate welding assembly of the console according to one embodiment of the present disclosure.

As shown in FIG. 19, the rear cover plate welding assembly 37 is also a weldment. As a main member, a rear base plate 37-1 is formed by laser cutting and then bent by the bending machine to be of a U-shaped structure. Decorative chamfered portions of the rear cover plate welding assembly 37 in a longitudinal direction are formed by a dedicated upper die.

As shown in FIGS. 18 and 19, a distance between outer surfaces of two bended straight side portions of the rear base plate 37-1 is identical to a height of the front base plate 35-1 (both shown by B), and the width of the bended straight side portions of the front base plate 35-1 is identical to that of the rear base plate 37-1 (both shown by G), so as to improve the contact comfort level of the console 19.

As shown in FIGS. 18 and 19, a thickness of the front base plate 35-1 is identical to that of the rear base plate 37-1 (both shown by D), and A represents a distance between an angular rib 35-2 and an edge of the front base plate 35-1. In order to assembly an assembly clearance, A=D+0.3 mm.

As shown in FIGS. 18 and 19, C represents a distance between inner surfaces of two bended straight side portions of the front base plate 35-1, and E represents a width of the rear base plate 37-1. In order to ensure the assembly clearance, C=E+0.5 mm.

In order to maintain the shape of the bending member, four angular ribs 35-2 are welded at inner corners of the front base plate 35-1, and four angular ribs 37-2 are welded at inner corners of the rear base plate 37-1. The angular ribs 37-1 and 37-2 are each provided with a connection hole. In order to improve the yield and reduce the number of the tapping steps, nuts 35-3 and 37-3 are welded at rear surfaces of the angular ribs 35-2 and 37-2, respectively. A welding tool is used to ensure the concentricity of the holes of the angular ribs 35-2 and threaded holes of the nuts 35-3, and the concentricity of the holes of the angular rib 37-2 and threaded holes of the nut 37-3.

In accordance with the structure mentioned in the summary, the combined guide rail, the sliding body 7 and the console 19 may be manufactured separately and then assembled so as to form the assistant arm.

Figure 4:
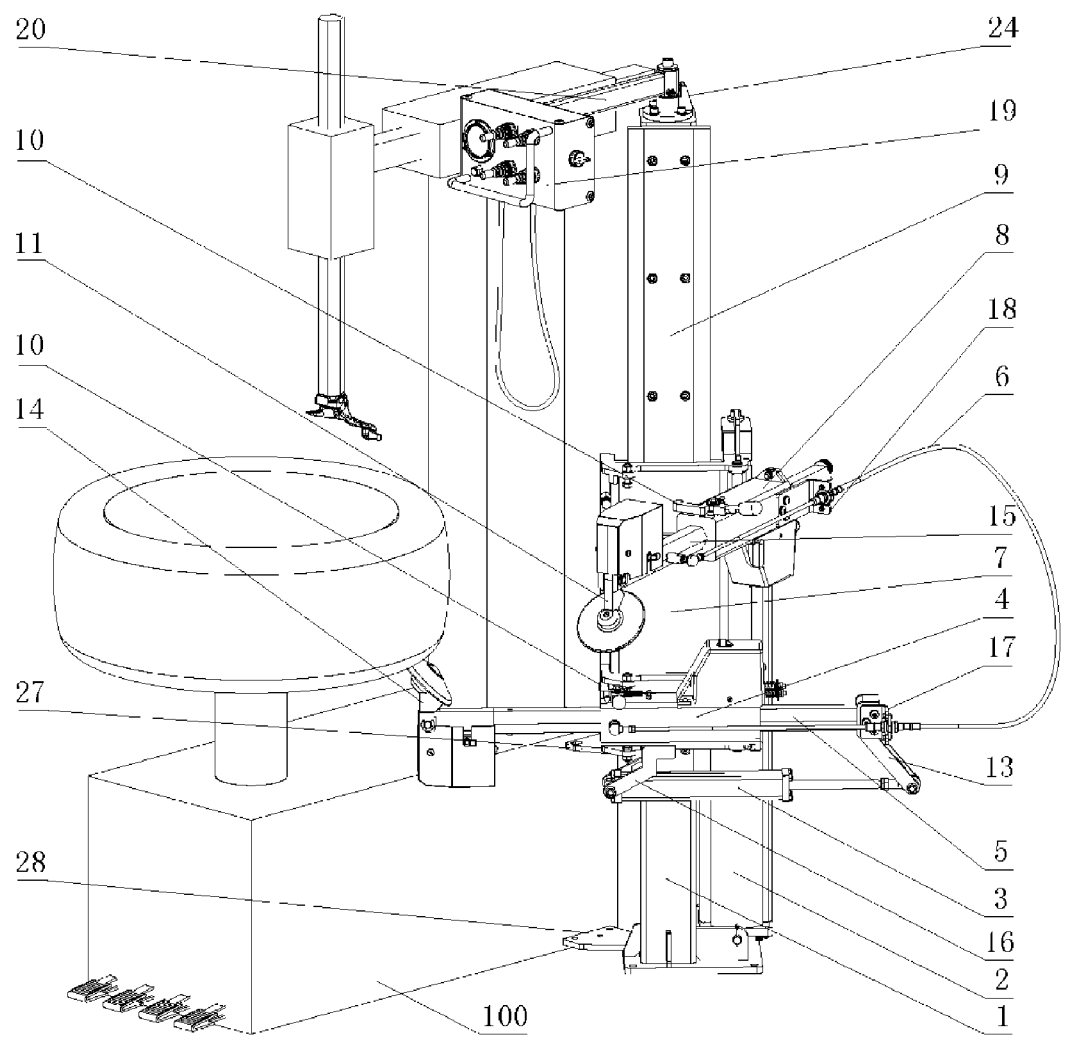
FIG. 4 is a schematic view showing a lower tire pressing mechanism according to one embodiment of the present disclosure.

The operating principle of the assistant arm will be described hereinafter. The longitudinal actuator 2 drives the sliding body 7 to move in a longitudinal direction of the guide rail plate 9. The upper tire pressing mechanism and the lower tire pressing mechanism hinged to the sliding body 7 can be swung outwardly and locked with the sliding body 7 separately. The upper tire pressing mechanism consists of the upper laterally-swinging guide sleeve 8, the upper guide column 15, the upper bead separator 11, the first micro-motion cylinder 33, the first locking plate 32, the first return spring 31 and the upper cylinder cover 30. The lower tire pressing mechanism consists of the lower laterally-swinging guide sleeve 4, the lower guide column 5, the lower bead separator 14, the second micro-motion cylinder 33, the second locking plate 32, the second return spring 31 and the lower cylinder cover 39, a shown in FIGS. 1 and 2. When an upper bead of the tire is operated using the assistant arm, the claw wrench 10 of the upper tire pressing mechanism is locked with the upper stopper 7-1 of the sliding body 7, so that the upper tire pressing mechanism is located at an operating position and the lower tire pressing mechanism is unlocked so as to be swung to a non-operating position, as shown in FIG. 3. When a lower bead of the tire is operated using the assistant arm, the claw wrench 10 of the lower tire pressing mechanism is locked with the lower stopper 7-2 of the sliding body 7, so that the lower tire pressing mechanism is located at an operating position and the upper tire pressing mechanism is unlocked so as to be swung to a non-operating position, as shown in FIG. 4.

When the upper bead separator 11 or the lower bead separator 14 is in an operating state, the upper guide column 15 or the lower guide column 5 connected thereto is located at a locked position. To be specific, a thrust force is applied by the first or second micro-motion cylinder 33 so as to move the first or second locking plate 32 in a direction slightly offset from a normal of the upper guide column 15 or the lower guide column 5, thereby to lock the upper guide column 15 or the lower guide column 5; and when no thrust force is applied by the first or second micro-motion cylinder 33, the first or second locking plate 32 and the first or second micro-motion cylinder 33 are reset by means of the first or second return spring 31, so as to unlock the upper guide column 15 or the lower guide column 5, as shown in FIGS. 11 and 12.

The upper spherical hinge plate 6-2 of the spherical hinge plate push-pull flexible shaft 6 is mounted within the upper bracket 18 for the flexible shaft, and the upper bracket 18 for the flexible shaft is mounted at the lateral surface of the upper laterally-swinging guide sleeve 8. Because the upper laterally-swinging guide sleeve 8 is relatively fixed in a direction of a guide hole and can merely be swung about the upper joint shaft 12, the upper spherical hinge plate 6-2 is also relatively fixed and can merely be swung along with the upper laterally-swinging guide sleeve 8. A lower core spindle 6-3 of the spherical hinge plate push-pull flexible shaft 6 is fixed at the lateral surface of the lower laterally-swinging guide sleeve 4 through the rod end ball joint bearing 6-5 at the lower end. Because the lower laterally-swinging guide sleeve 4 is relatively fixed in a direction of a guide hole and can merely be swung about the lower joint shaft 22, the lower core spindle 6-3 of the spherical hinge plate push-pull flexible shaft 6 is also relatively fixed and can merely be swung along with the lower laterally-swinging guide sleeve 4. When the lateral actuator 3 drives the lower guide column 5 by means of the rear bracket 13 to move to the right, the lower guide column 5 drives the lower bead separator 14 to move to the right too. Meanwhile, the rear bracket 13 drives the lower spherical hinge plate 6-4 of the spherical hinge plate push-pull flexible shaft 6 by means of the lower bracket 17 for the flexible shaft to move to the right. Because one end of the spherical hinge plate push-pull flexible shaft 6 is contracted equally when the other end is extended, an upper core spindle 6-1 of the spherical hinge plate push-pull flexible shaft 6 drives the upper guide column 15 by means of the rod end ball joint bearing 6-5 at the upper end to move to the right, and the upper guide column 15 then drives the upper bead separator 11 to move to the right too, as shown in FIG. 16. At this time, the upper bead separator 11 and the lower bead separator 14 move laterally and synchronously. And vice versa.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. An assistant arm for an automobile tire changer mounted at an operating side of a main body of the automobile tire changer, comprising a longitudinal actuator, a lateral actuator, an upper guide column, a lower guide column, an upper bead separator and a lower bead separator, wherein the assistant arm is of a one-for-two structure, i.e., the longitudinal actuator is provided with one sliding body that slides along a guide rail plate, an upper end of the sliding body is hinged to an upper tire pressing mechanism, and a lower end of the sliding body is hinged to a lower tire pressing mechanism;

the upper tire pressing mechanism consists of an upper laterally-swinging guide sleeve, the upper guide column, the upper bead separator, a first micro-motion cylinder, a first locking plate, a first return spring and an upper cylinder cover;

the lower tire pressing mechanism consists of a lower laterally-swinging guide sleeve, the lower guide column, the lower bead separator, a second micro-motion cylinder, a second locking plate, a second return spring and a lower cylinder cover;

the guide rail plate is combined with a vertical column, i.e., the guide rail plate is mounted on the vertical column, to form a combined guide rail which forms a moving pair together with the sliding body;

the guide rail plate is a bar-like plate made of 45# steel and having a rigidity of HRC42, and a straightness and a flatness of each less than or equal to 0.05 mm/m;

the vertical column comprises a square or rectangular tube as an anti-buckling beam, several small disc-shaped front protrusions are welded onto an upper portion of the vertical column, several small disc-shaped lower protrusions are welded onto a lower portion, and at lateral surfaces, of the vertical column, a machined surface of the vertical column, after being milled, forms a reference surface for mounting the guide rail plate, and the machined surface is of a flatness of less than or equal to 0.1 mm/m;

the vertical column is mounted at the operating side of the main body of the automobile tire changer through an upper connection seat and a lower connection seat, and the guide rail plate is mounted on the mounting reference surface of the vertical column;

the sliding body comprises a steel channel as a main member, an upper stopper, a lower stopper, a first lateral rib and a second lateral rib are welded onto the steel channel, dowel holes are provided in the middle of the steel channel, dowel grooves are arranged at upper and lower ends of the steel channel, the first lateral rib and the second lateral rib are each provided with a square convex dowel whose cross section matches with cross sections of the corresponding dowel hole and dowel groove of the steel channel, the first lateral rib is provided with a stopping dowel hole, and the upper stopper and the lower stopper are each provided with a square convex dowel whose cross section matches with a cross section of the corresponding stopping dowel hole;

a slider is mounted inside the sliding body and forms a friction pair together with the guide rail plate, the sliding body is connected to a piston rod of the longitudinal actuator through a thrust joint bearing or a rod end joint bearing, and a lower end of the longitudinal actuator is hinged to a bottom of the vertical column through a lug shaft;

the upper laterally-swinging guide sleeve is hinged to the upper end of the sliding body through an upper joint shaft, and the lower laterally-swinging guide sleeve is hinged to the lower end of the sliding body through a lower joint shaft;

the upper laterally-swinging guide sleeve and the lower laterally-swinging guide sleeve are each provided with a claw wrench whose working surface matches with a working surface of the corresponding upper stopper or lower stopper;

the upper guide column is mounted within a square hole of the upper laterally-swinging guide sleeve, a front end of the upper guide column is connected to the upper bead separator, the lower guide column is mounted within a square hole of the lower laterally-swinging guide sleeve, a front end of the lower guide column is connected to the lower bead separator, and a rear end of the lower guide column is connected to a rear bracket, the rear bracket is connected to a piston rod of the lateral actuator, the other end of the lateral actuator is connected to a front bracket, and the front bracket is arranged at a lower surface of the lower laterally-swinging guide sleeve;

an upper spherical hinge plate of a spherical hinge plate push-pull flexible shaft is mounted within an upper bracket for the flexible shaft, the upper bracket for the flexible shaft is mounted at a lateral surface of the upper laterally-swinging guide sleeve, an upper core spindle of the spherical hinge plate push-pull flexible shaft is connected to the upper guide column, a lower core spindle of the spherical hinge plate push-pull flexible shaft is mounted at a lateral surface of the lower laterally-swinging guide sleeve, a lower spherical hinge plate of the spherical hinge plate push-pull flexible shaft is mounted within a lower bracket for the flexible shaft, the lower bracket for the flexible shaft is mounted at a lateral surface of the rear bracket, a rod end ball joint bearing at an upper end of the spherical hinge plate push-pull flexible shaft is connected to the upper guide column, a rod end ball joint bearing at a lower end of the spherical hinge plate push-pull flexible shaft is mounted at a lateral surface of the lower laterally-swinging guide sleeve, and the lower bracket for the flexible shaft is mounted at a lateral surface of the rear bracket;

a console is hinged to a support arm, the support arm is hinged to a flange mounted at the upper portion of the vertical column; and the console consists of a handle, a front plate welding assembly, a rear cover plate welding assembly, a tapered gasket and a sunk screw.

2. The assistant arm according to claim 1, wherein the first micro-motion cylinder and the upper cylinder cover are arranged at a lower surface of the upper laterally-swinging guide sleeve, the first locking plate is arranged at a rear end of the upper laterally-swinging guide sleeve, the first micro-motion cylinder is connected to a surface of a lower portion of the first locking plate, the first return spring is connected to the opposite surface of the lower portion of the first locking plate, the upper guide column passes through square holes in the upper laterally-swinging guide sleeve and the first locking plate, and the front end of the upper guide column is connected to the upper bead separator; and the second micro-motion cylinder and the lower cylinder cover are arranged at an upper surface of the lower laterally-swinging guide sleeve, the second locking plate is arranged at a rear end of the lower laterally-swinging guide sleeve, the second micro-motion cylinder is connected to a surface of an upper portion of the second locking plate, the second return spring is connected to the opposite surface of the upper portion of the second locking plate, the lower guide column passes through square holes in the lower laterally-swinging guide sleeve and the second locking plate, the front end of the lower guide column is connected to the lower bead separator, the rear end of the lower guide column is connected to the rear bracket, the rear bracket is connected to the piston rod of the lateral actuator, the other end of the lateral actuator is connected to the front bracket, and the front bracket is arranged at the lower surface of the lower laterally-swinging guide sleeve.

3. The assistant arm according to claim 1, wherein the sliding body is a forging member, which provided with the upper stopper, the lower stopper, the first lateral rib and the second lateral rib, the slider is mounted inside the sliding body.

4. A method for manufacturing principal parts of an assistant arm for an automobile tire changer, comprising methods for manufacturing a combined guide rail, a sliding body and a console, wherein
   a guide rail plate and a vertical column are combined to form the combined guide rail, the vertical column comprises a square or rectangular steel tube as an anti-buckling beam, several disc-shaped small front protrusions are welded onto a front surface of the anti-buckling beam, several disc-shaped small lower protrusions are welded onto a lower portion and lateral surfaces of the anti-buckling beam, after the welding, the front protrusions is machined by milling to form a mounting reference surface for the guide rail plate, the mounting reference surface for the guide rail plate has a flatness of less than or equal to 0.1 mm/m and it is provided with threaded holes, the lower protrusions are machined by milling so as to form a mounting reference surface for an upper connection seat and a lower connection seat, and the mounting reference surface for the upper connection seat and the lower connection seat has a flatness of less than or equal to 0.1 mm/m and it is provided with threaded holes;
   the guide rail plate is mounted on the vertical column so as to form the combined guide rail;
   the sliding body comprises a steel channel as a main member, dowel holes are provided in the middle of the steel channel, dowel grooves are provided at upper and lower ends of the steel channel, a first lateral rib and a second lateral rib are each provided with a square convex dowel whose cross section matches with cross sections of the corresponding dowel hole and dowel groove of the steel channel, and the first lateral rib and the second lateral rib are positioned onto the steel groove by welding;
   the first lateral rib is provided with a stopping dowel hole, an upper stopper and a lower stopper are each provided with a square convex dowel whose cross section matches with a cross section of the corresponding stopping dowel hole, and the upper stopper and the lower stopper are positioned onto the upper and lower first lateral ribs, respectively, by welding;
   the console consists of a handle, a front plate welding assembly, a rear cover plate welding assembly, a tapered gasket and a sunk screw;
   the handle is formed by pre-heating and bending cold-drawn round steel with a die, threaded holes are provided at two ends of the handle, and then the handle is polished and chrome-plated;
   the front plate welding assembly is a weldment, a front base plate, as a main member of the front plate welding assembly, is formed by laser cutting and then bent by a bending machine to be of a U-shaped structure, and chamfered portions of the front plate welding assembly in a horizontal direction are formed by a dedicated upper die;
   the rear cover plate welding assembly is a weldment, a rear base plate, as a main member of the rear cover plate welding assembly, is formed by laser cutting and then bent by the bending machine to be of a U-shaped structure, and chamfered portions of the rear cover plate welding assembly in a longitudinal direction are formed by a dedicated upper die;
   a distance between outer surfaces of two bended straight side portions of the rear base plate is identical to the height of the front base plate, and the width of bended straight side portions of the front base plate is identical to that of the rear base plate; and
   four angular ribs are welded at inner corners of the front base plate, four angular ribs are welded at inner corners of the rear base plate, the angular ribs are each provided with a connection hole, nuts are welded at rear surfaces of the angular ribs, respectively, and a welding tool is used to ensure the concentricity of the holes of the angular ribs and threaded holes of the nuts, and the concentricity of the holes of the angular ribs and threaded holes of the nuts.

5. The method according to claim 4, wherein a blank is forged, and then processed by a commonly-used mechanical cutting technique so as to form the sliding body of a structure identical to the sliding body manufactured by welding.

6. The method according to claim 4, wherein an assembly error is eliminated in the following two ways:
   eliminating the assembly error through a thrust joint bearing, a bearing race of which is connected to the sliding body and a seat retainer of which is connected to the piston rod of the longitudinal actuator; and
   eliminating the assembly error through a rod end joint bearing, an inner race of which is hinged to the sliding body and a rod end of which is connected to the piston rod of the longitudinal actuator,
   the two methods utilize the self-alignment function of the two kinds of joint bearings to eliminate the assembly error.

* * * * *